United States Patent
Cancedda et al.

(10) Patent No.: US 7,542,893 B2
(45) Date of Patent: Jun. 2, 2009

(54) MACHINE TRANSLATION USING ELASTIC CHUNKS

(75) Inventors: Nicola Cancedda, Grenoble (FR); Marc Dymetman, Grenoble (FR); Eric Gaussier, Eybens (FR); Cyril Goutte, Ottawa (CA)

(73) Assignee: Xerox Corporation, Norwalk, CT (US)

( * ) Notice: Subject to any disclaimer, the term of this patent is extended or adjusted under 35 U.S.C. 154(b) by 574 days.

(21) Appl. No.: 11/431,393

(22) Filed: May 10, 2006

(65) Prior Publication Data
US 2007/0265825 A1 Nov. 15, 2007

(51) Int. Cl.
G06F 17/28 (2006.01)

(52) U.S. Cl. ............................... 704/2; 704/277; 704/5

(58) Field of Classification Search ............... 704/1–10, 704/277, 255, 257, 251, 252
See application file for complete search history.

(56) References Cited

U.S. PATENT DOCUMENTS

| | | | |
|---|---|---|---|
| 5,140,522 A | 8/1992 | Ito et al. | |
| 5,408,410 A | 4/1995 | Kaji | |
| 5,477,451 A | 12/1995 | Brown et al. | |
| 5,608,622 A | 3/1997 | Church | |
| 5,991,710 A | 11/1999 | Papineni et al. | |
| 6,182,026 B1 | 1/2001 | Tillmann et al. | |
| 6,236,958 B1 | 5/2001 | Lange et al. | |
| 6,304,841 B1 | 10/2001 | Berger et al. | |
| 6,338,057 B1 | 1/2002 | Weeks | |
| 6,473,896 B1 | 10/2002 | Hicken et al. | |
| 6,542,866 B1 | 4/2003 | Jiang et al. | |
| 6,678,415 B1 | 1/2004 | Popat et al. | |
| 6,848,080 B1 | 1/2005 | Lee et al. | |
| 6,885,985 B2 | 4/2005 | Hull | |
| 6,996,518 B2 | 2/2006 | Jones et al. | |
| 7,191,115 B2 | 3/2007 | Moore | |
| 7,353,165 B2* | 4/2008 | Zhou et al. ..................... | 704/5 |
| 2002/0198699 A1 | 12/2002 | Greene et al. | |
| 2004/0024581 A1 | 2/2004 | Koehn et al. | |
| 2004/0030551 A1 | 2/2004 | Marcu et al. | |
| 2005/0108000 A1 | 5/2005 | Kempe et al. | |
| 2005/0228643 A1 | 10/2005 | Munteanu et al. | |
| 2006/0009963 A1 | 1/2006 | Gaussier et al. | |

(Continued)

OTHER PUBLICATIONS

U.S. Appl. No. 11/315,043, filed Dec. 22, 2005, Cancedda, et al.

(Continued)

*Primary Examiner*—Huyen X. Vo
(74) *Attorney, Agent, or Firm*—Fay Sharpe LLP

(57) ABSTRACT

A machine translation method includes receiving source text in a first language and retrieving text fragments in a target language from a library of bi-fragments to generate a target hypothesis. Each bi-fragment includes a text fragment from the first language and a corresponding text fragment from the second language. Some of the bi-fragments are modeled as elastic bi-fragments where a gap between words is able to assume a variable size corresponding to a number of other words to occupy the gap. The target hypothesis is evaluated with a translation scoring function which scores the target hypothesis according to a plurality of feature functions, at least one of the feature functions comprising a gap size scoring feature which favors hypotheses with statistically more probable gap sizes over hypotheses with statically less probable gap sizes.

22 Claims, 5 Drawing Sheets

U.S. PATENT DOCUMENTS

2007/0033001 A1    2/2007    Muslea et al.

OTHER PUBLICATIONS

M. Carl, A. Way, "Workshop on Example-Based Machine Translation", MT-Summit VIII, Santiago de Compostela, Spain, Sep. 18-22, 2001.

M. Simard, N. Cancedda, B. Cavestro, M. Dymetman, E. Gaussier, C. Goutte, K. Yamada, "Translating with Non-Continuous Phrases", (English Translation of Traduction Automatique Statistique Avec Des Segments Discontinues) 12th Annual Conference on the Automatic Treatment of Natural Language (TALN), pp. 233-242, Dourdan, France, (Jun. 2005).

P.F.Brown, S.A.D.Pietra, V.J.D.Pietra, R.L.Mercer, *The Mathematics of Statistical Machine Translation: Parameter Estimation*, Computational Linguistics, 19(2):263-311, 1993.

C.Goutte, K.Yamada, E.Gaussier, *Aligning Words Using Matrix Factorisation*, Proc. ACL'04, pp. 503-510, (2004).

P.Koehn, *Pharaoh: A Beam Search Decoder for Phrase-Based Statistical Machine Translations Models*, USC Information Science Institute, Dec. 2003.

F.J.Och, H.Ney, *A Systematic Comparison of Various Statistical Alignment Models*, Computational Linguistics, 29(1):19-51, Mar. 2003.

F.J.Och, H.Ney, *The Alignment Template Approach to Statistical Machine Translation*, Computational Linguistics, 30(4):417-449, 2004.

C.Tillmann, F.Xia, *A Phrase-Based Unigram Model for Statistical Machine Translation*, Proc. of the HLT-NAACL 2003 Conference, Edmonton, Canada, 2003.

N.Ueffing, F.J.Och, H.Ney, *Generation of Word Graphs in Statistical Machine Translation*, Proc. of the 7th Conference on Empirical Methods in Natural Language Processing (EMNLP), pp. 156-163, Philadelphia, 2002.

R.Zens, H.Ney, *Improvements in Phrase-Based Statistical Machine Translation*, Proc. of the Human Language Technology Conference (HLT-NAACL), 2004.

C.Chenon, *Vers une meilleure utilisabilite des memoires de traduction fondee sur un alignement sous-phrastique*. These de Doctorat, Universite Joseph Fourier, Oct. 2005 (Abstract).

D.Chiang, *A Heirarchical Phrase-Based Model For Statistical Machine Translation*, Proc. 43rd Meeting of the Association for Computational Linguistics (ACL), Ann Harbor, Michigan, Jun. 2005.

B.Efron, C.Morris, *Stein's Paradox In Statistics*, Scientific American, 236, 119-127, 1977.

U.S. Appl. No. 11/431,393, filed May 10, 2006, Cancedda, et al.

U.S. Appl. No. 11/789,089, filed Apr. 20, 2007, Pacull.

Brown, Example-Based Machine Translation in the Pangloss System, In *Proc. of the 16th Intl. Conf. on Computational Linguistics (COLING-96)*, pp. 169-174, Denmark, Aug. 5-9, 1996.

http://en.wikipedia.org/wiki/Poisson_distribution, downloaded Mar. 22, 2006.

A.Crabtree, J.O'Neill, P.Tolmie, S.Castellani, T.Colombino, A.Grasso, The Practical Indispensability of Articulation Work to Immediate and Remote Help-Giving, *Proc. of the 2006 ACM Conference on Computer Supported Cooperative Work*, Banff: ACM Press, 2006.

A.Kempe, Acronym-Meaning Extraction from Corpora Using Multitape Weighted Finite-State Machines, *Xerox Corporation, Research Report 2006/019*, Jul. 26, 2006.

A.Kempe, F.Guingne, F.Nicart, Algorithms for Weighted Multi-Tape Automata, *Xerox Corporation, Research Report 2004/031*, Meylan, France, 2004.

A.Kempe, J.M.Champarnaud, J.Eisner, A Note on Join and Auto-Intersection of n-ary Rational Relations, In B. Watson and L. Cleophas, editors, *Proceedings Eindhoven FASTAR Days*, No. 04-40 in TU/e CS TR, pp. 64-78, Eindhoven, Netherlands, 2004.

A.Kempe, J.M.Champarnaud, J.Eisner, F.Guingne, F.Nicart, A Class of Rational n-WFSM Auto-Intersections, *In FSMNLP*, Helsinki, Finland, 2005.

A.P.Dempster, et al., Maximum Likelihood from Incomplete Data Using the EM Algorithm, *Journal of the Royal Statistical Society, Series B (Methodological)*, vol. 39, No. 1, pp. 1-38, 1977.

D.Yarowsky, G.Ngai, R.Wicentowski, Inducing Multilingual Text Analysis Tools Via Robust Projection Across Aligned Corpora, In *Proceedings of HLT*, San Diego, CA, 2001.

E.Gaussier, Flow Network Models for Word Alignment and Terminology Extraction from Bilingual Corpora, *In Proceedings of the 36th Annual Meeting of the Association for Computational Linguistics and 17th Intl Conference on Computational Linguistics*, pp. 444-450, San Francisco, CA, 1998.

E.Hovy, et al., Principles of Context-Based Machine Translation Evaluation, *Machine Translation*, 17:43-75, Netherlands, 2002.

F.J.Och, C.Tillman, H.Ney, Improved Alignment Models for Statistical Machine Translation, *In Proceedings of EMNLP/VLC 1999*, pp. 20-28, University of Maryland, College Park, MD, 1999.

F.J.Och, et al., A Comparison of Alignment Models for Statistical Machine Translation, *In Proc. of the 18th Intl. Conf. on Computational Linguistics*, vol. 2, pp. 1086-1090, Morristown, NJ, 2000.

H.Dejean, E.Gaussier, J.M.Renders, F.Sadat, Automatic Processing of Multilingual Medical Terminology: Applications to Thesaurus Enrichment and Cross-Language Information Retrieval, *Artificial Intelligence in Medicine*, vol. 33, No. 2, pp. 111-124, 2005.

H.Dejean, F.Sadat, E.Gaussier, Bilingual Lexicon Extraction: Using and Enriching Multilingual Thesauri, *Proceedings of Terminology Knowledge Extraction*, Nancy, France, Aug. 2002.

I.Dagan, K.Church, Termight: Coordinating Man and Machine in Bilingual Terminology Acquisition, *Journal Tex*, Jul. 24, 1996.

J.Martin, R.Mihalcea, T.Pedersen, Word Alignment for Languages with Scarce Resources, *In Proceedings of ACL Workshop on Building and Using Parallel Text*, Ann Arbor, MI, 2005.

Lodhi, et al., Text Classification Using String Kernels, *Advances in Neural Information Processing Systems*, 13 (pp. 563-569) MIT Press (2001).

M.Simard, P.Plamondon, Bilingual Sentence Alignment: Balancing Robustness and Accuracy, *Machine Translation*, vol. 13, No. 11, Mar. 1998.

N.Aswani, R.Gaizauskas, A Hybrid Approach to Align Sentences and Words in English-Hindi Parallel Corpora, *In ACL Workshop on Building and Using Parallel Text*, 2005.

K.Papineni, et al., Bleu: A Method for Automatic Evaluation of Machine Translation, *Proc. of the 40th Annual Meeting of the Assn. for Computational Linguistics (ACL)*, Philadelphia, pp. 311-318, Jul. 2002.

P.Koehn, F.J.Och, D.Marcu, Statistical Phrase-Based Translation, *In Proceedings of HLT-NAACL*, Edmonton, Canada, 2003.

R.C.Moore, A Discriminative Framework for Bilingual Word Alignment, *Proceedings of HLT/EMNLP*, pp. 81-88, Vancouver, BC, Canada, Oct. 2005.

S.Kumar, W.Byrne, A Weighted Finite State Transducer Implementation of the Alignment Template Model for Statistical Machine Translation, *In HLT-NAACL 2003, Main Papers*, pp. 63-70, Edmonton, Canada, May-Jun. 2003.

S.Vogel, H.Ney, C.Tillmann, HMM-Based Word Alignment in Statistical Translation, *In COLING 96*, Copenhagen, 1996.

\* cited by examiner

MACHINE TRANSLATION USING ELASTIC CHUNKS

CROSS REFERENCE TO RELATED PATENTS AND APPLICATIONS

Cross-reference is made to U.S. application Ser. No. 11/315,043, filed Dec. 22, 2005, entitled MACHINE TRANSLATION USING NON-CONTIGUOUS FRAGMENTS OF TEXT, by Nicola Cancedda, et al., the disclosure of which is incorporated herein by reference in its entirety.

BACKGROUND

The present exemplary embodiment is directed to the field of machine translation. It finds particular application in the translation of non-contiguous bi-fragments of text.

A recent development in statistical machine translation has entailed the step from word-based models to phrase-based models. While in traditional word-based statistical models, the atomic unit that translation operates on is the word, phrase-based methods acknowledge the significant role played in language by multi-word expressions, thus incorporating, in a statistical framework, the insight behind Example-Based Machine Translation. Example-Based Machine Translation seeks to exploit and integrate a number of knowledge resources, such as linguistics and statistics, and symbolic and numerical techniques, for integration into one framework. In this way, rule-based morphological, syntactic and/or semantic information is combined with knowledge extracted from bilingual texts which is then re-used in the translation process.

Many recent natural language translation methods operate on the basis of bi-fragments: these are pairs of equivalent fragments of text, one in the source language (the language in which a document to be translated is expressed), one in the target language (the language into which the document is to be translated). Such methods are often collectively referred to as "phrase-based methods". The bi-fragments on which they operate are harvested automatically from large collections of previously translated texts ("bilingual parallel corpora"), and stored in a database. When given a new segment of text to translate, these systems search the database to extract all relevant bi-fragments, i.e., items in the database whose source-language fragment matches some portion of the new input. A subset of these matching bi-fragments is then searched for, such that each word of the input text is covered by exactly one bi-fragment in the subset, and that the combination of the target-language fragments produces a coherent translation.

In general, phrase-based models proposed so far only deal with multi-word units that are sequences of contiguous words on both the source and the target side.

In many translation systems, the quality of the resulting translation is assessed by means of a statistical translation model, which estimates the probability of observing some target-language segment of the text as the translation of the given source-language input. The translation problem reduces to that of finding the combination of bi-fragments which produces the most probable translation. This is a complex task, because the number of possible translations typically grows exponentially with the size of the input, and so not all solutions can be examined in practice. Sub-optimal search procedures are usually employed, that rely on dynamic programming, A*-like beam-search, or heuristic hill-climbing methods.

INCORPORATION BY REFERENCE

The following references, the disclosures of which are incorporated herein in their entireties by reference, are mentioned:

U.S. Pat. No. 5,477,451 by Brown, et al. entitled "METHOD AND SYSTEM FOR NATURAL LANGUAGE TRANSLATION," and U.S. Pat. No. 6,304,841 by Berger, et al., entitled "AUTOMATIC CONSTRUCTION OF CONDITIONAL EXPONENTIAL MODELS FROM ELEMENTARY FEATURES" describe word-based statistical machine translation methods and systems for natural language translation. In the U.S. Pat. No. 6,304,841, log-linear features are used to score word hypotheses depending on their lexical context.

The following references relate to phrase-based statistical machine translation methods. U.S. Pat. No. 6,182,026 by Tillmann, et al., entitled "METHOD AND DEVICE FOR TRANSLATING A SOURCE TEXT INTO A TARGET USING MODELING AND DYNAMIC PROGRAMMING," discloses a method and device for translating a source text into a target using modeling and dynamic programming. The method uses a monotonic phrase-based decoder for translation of contiguous phrases.

U.S. Published Application No. 2004/0024581 by Koehn, et al., entitled "STATISTICAL MACHINE TRANSLATION," discloses a phrase-based statistical machine translation method using syntactic markers for contiguous phrases.

U.S. Published Application No. 2004/0030551 by Marcu, et al., entitled "PHRASE TO PHRASE JOINT PROBABILITY MODEL FOR STATISTICAL MACHINE TRANSLATION" discloses a phrase to phrase joint probability model for statistical machine translation. The phrase-based translation is performed using a generative approach (joint model for source-target).

BRIEF DESCRIPTION

Aspects of the exemplary embodiment relate to a machine translation method and system for machine translation.

In one aspect, a machine translation method is provided for translating source text from a first language to target text in a second language. The method includes receiving the source text in the first language, accessing a library of bi-fragments, each of the bi-fragments including a text fragment from the first language and a text fragment from the second language. At least some of the bi-fragments are modeled as elastic bi-fragments in which words of a fragment are spaced by a gap which is able to assume a variable size corresponding to a number of other words which are to occupy the gap. The method further includes retrieving text fragments from the second language from the library corresponding to text fragments in the source text, and generating at least one target hypothesis. Each of the target hypotheses includes text fragments selected from the second language. The target hypothesis is evaluated with a translation scoring function which scores the target hypothesis according to a plurality of feature functions. At least one of the feature functions includes a gap size scoring feature which favors hypotheses with statistically more probable gap sizes over hypotheses with statically less probable gap sizes.

In another aspect, a machine translation system is provided for translating source text from a first language to target text in a second language. The translation system includes a library of bi-fragments. Each of the bi-fragments includes a text fragment from the first language and a text fragment from the second language. At least some of the bi-fragments are modeled as elastic bi-fragments in which words of a fragment are spaced by a gap which is able to assume a variable size corresponding to a number of other words which are to occupy the gap. Each of the elastic bi-fragments is associated in memory with a parameter representative of a gap size distribution for the bi-fragment. A processor executes instructions for retrieving text fragments from the second language from the library corresponding to text fragments in the source text and for generating at least one target hypothesis, each of the target hypotheses comprising text fragments selected from the second language, and for evaluating the hypothesis with a translation scoring function which scores the hypothesis according to a plurality of features, at least one of the features including a gap size scoring feature which favors hypotheses comprising text fragments with statistically more probable gap sizes over hypotheses with statically less probable gap sizes.

DETAILED DESCRIPTION

Figure 1:
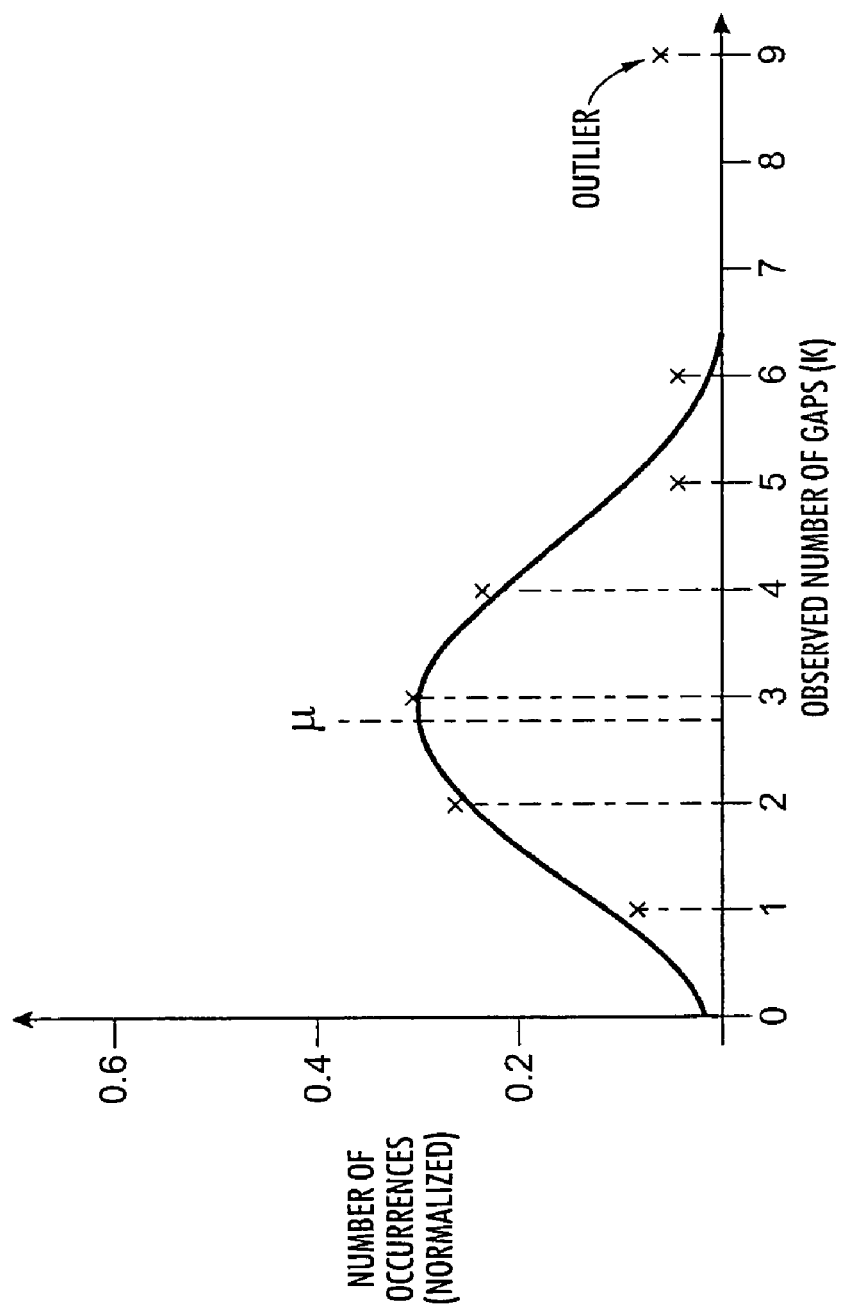
FIG. 1 is a simulated distribution of gaps in a target phrase of a bi-phrase for a selected number of gaps in the corresponding source phrase.

Aspects of the exemplary embodiment relate to a method for translating source text from a first language to target text in a second language. The method may include receiving the source text in the first language and accessing a library of bi-fragments, each of the bi-fragments including a text fragment from the first language and a text fragment from the second language. At least some of the bi-fragments are modeled as elastic bi-fragments in which words of a fragment are spaced by a gap which is able to assume a variable size corresponding to a number of other words which are to occupy the gap. Text fragments from the second language are retrieved from the library. Each of the retrieved text fragments is linked in a bi-phrase in the library to a text fragment from the source text. At least one target hypothesis is generated. Each of the target hypotheses comprises text fragments selected from the second language. The hypothesis may be scored according to a plurality of feature functions, at least one of the feature functions comprising a gap size scoring feature which favors statistically more probable gap sizes over statically less probable gap sizes. The scoring may include maximizing a log-linear scoring function in which weights are assigned to each of the feature functions.

In another aspect, a machine translation system translates source text from a first language to target text in a second language. The translation system includes a library of bi-fragments, each of the bi-fragments including a text fragment from the first language and a text fragment from the second language. At least some of the bi-fragments are modeled as elastic bi-fragments in which words of a fragment are spaced by a gap which is able to assume a variable size corresponding to a number of other words which are to occupy the gap. The elastic bi-fragments are associated with a probability distribution parameter which enables statistically more probable gap sizes to be favored in a translation hypothesis gap size scoring feature. The system includes a processor which executes instructions for receiving the source text in the first language, accessing the library to retrieve text fragments from the second language, scoring hypotheses according to a plurality of features including the gap scoring feature.

Above-mentioned application Ser. No. 11/315,043 (hereinafter Cancedda, et al.) discloses a computer implemented system and method for translating source text from a first language to target text in a second language different from the first language and to a method of training such a translation system. In one aspect, a phrase-based statistical machine translation method is provided, based on non-contiguous bi-phrases, i.e., source or target phrases with gaps, in which each gap represents a placeholder for a word.

In the system and method of Cancedda, et al., the gaps between the words are of a predefined, fixed size (represented here by the symbol ◊). Thus, different gap sizes can result in different hypotheses, each one being separately analyzed. For example, the bi-phrase:

ne ◊ pas|does not which includes one gap on the source side, corresponding to one word, generates a different hypothesis from the bi-phrase ne ◊ ◊ pas|does not which includes two gaps.

As will be appreciated, where there are gaps on both the source and target sides, a substantial number of potential hypotheses may be generated corresponding to different numbers of gaps on both the source and target sides. While the advantages of such an approach are its (relative) simplicity regarding the computation of bi-phrase statistics and the decoding procedure a relatively large training corpus may be needed to provide data for all combinations of gaps likely to be seen in practice. Otherwise, if no instance of a target gap of a given size is observed, translations using this configuration will not be generated automatically, even though instances with smaller and larger gaps exist in the training corpus. Additionally, confronted with several translation hypotheses for ne ◊ pas that differ only in the size of the gap, the decoder of Cancedda, et al. has to store and process these different hypotheses in complete isolation from each other, although they share many characteristics and could to a large extent be factorized. Also, the decoder has a tendency to make blind predictions on the size of the gaps before it is able to evaluate the quality and compatibility of potential filling material, which depends both on the language model and on the availability of other elements of the bi-phrase library.

For example, in the method of Cancedda, et al., the non-contiguous bi-phrase ne ◊ plus|not ◊ ◊ ◊ anymore can be used for producing the following translation: je ne veux plus danser le tango|I do not want to tango anymore. However, a different bi-phrase ne ◊ plus|not ◊ ◊ ◊ ◊ ◊ anymore is used to produce the translation: je ne veux plus faire la vaisselle|I do not want to do the dishes anymore; in order to produce that translation the building block with a gap on the target side of size five instead of three is needed.

In the present exemplary embodiment, the gaps can assume different sizes with certain probabilities. An advantage of such a model is that the bi-phrases obtained generalize over the training data. As a consequence, the model is able to consider an extended and more representative class of potential translations and to evaluate them more accurately. The exemplary embodiment introduces the notion of elastic bi-phrase, and provides a decoding mechanism for producing translations using the resulting model.

In various aspects a decoder for handling such "elastic" bi-phrases is provided. The decoder may buffer the parts of elastic phrases in the target text which are not yet consumed, and may use a heuristic cost function that takes into account these buffered parts in assessing the value of a partial translation hypothesis.

In another aspect, a statistical translation model is provided that deals with such phrases. In another aspect, a training method is provided which is based on the maximization of translation accuracy, for example, as measured with the National Institute of Standards and Technology (NIST) evaluation metric. The translations may be produced by means of a beam-search decoder or other suitable optimizing function which takes into account the probabilities of various hypothetical translations being found in practice.

The exemplary translation method translates natural language text, such as French to English, using as primary resource a collection of bi-fragments, i.e., matching pairs of source-target fragments of text. Translations are produced by combining together such bi-fragments. A search for the optimal combination may be performed by means of a specially adapted, multiple-stack beam search. Within this search procedure, the potential of each candidate translation is evaluated by means of a statistical model of translation.

A "phrase," as used herein generally refers to two or more words in either the source or target language.

A "non-contiguous phrase" refers to two or more words in either the source or target language wherein two of the words are separated by a gap of at least one word. Each non-contiguous phrase includes a first portion comprising at least one word, which is separated from a second portion, comprising at least one word, by a gap of at least one word.

A "bi-fragment," as used herein, generally comprises two text fragments: a first text fragment in the source language and a second text fragment in the target language, which is a translation of the first text fragment. The first and second text fragments may be a word or a phrase. The first and second fragments are associated in a word-aligned corpora, such as a library stored in memory, whereby a target fragment corresponding to an input source fragment may be retrieved. It will be appreciated that a text fragment in one language may appear in more than one bi-fragment, where multiple translations exist. A "non-contiguous bi-fragment," as used herein, refers to a bi-fragment in which at least one of the text fragments comprises a non-contiguous phrase.

It should be noted that in many cases discussed herein, both fragments of a bi-fragment are phrases (i.e., a bi-phrase) although they need not be so. Thus, where reference may be made herein to bi-phrases, it is to be appreciated that the more general case of a bi-fragment is also contemplated, unless otherwise noted.

Each non-contiguous bi-fragment may be treated as an "elastic bi-fragment" and may be associated, in memory, with a gap function, which is related to a statistical probability of the number of gaps in the target fragment for a given number of gaps in the source fragment. This may be used to determine a cost function to a given hypothesis in a scoring model. In general, the cost decreases as the hypothesis moves toward a number of gaps which corresponds to the statistically determined most likely number of gaps. If the most likely number of gaps has already been exceeded in a partial translation, the cost favors inserting the second part of the target fragment sooner rather than later.

The bi-fragments may be learned from a large aligned bilingual corpus comprising source text and its translation into target text. The statistics of bi-phrases can be established through observation of a corpus. It is to be appreciated that direct observation of a bi-phrase in a given sentence pair is not necessary, but rather the presence of such a bi-phrase can be indirectly induced through phrase-level alignment mechanisms. However, once this presence is established, the size of the gaps may be unambiguously determined. For each bi-fragment identified from the corpus, a probability distribution (or a mean of the probability distribution) representing the statistical probabilities of number of gaps in the target fragment for each observed number of gaps in the source may be stored and used to develop distributions.

Modeling Elastic Bi-Fragments

The non-contiguous bi-fragments are expressed in terms of elastic bi-phrases. Each elastic bi-phrase is considered to be a pair of gapped phrases, one in the source language and one in the target language. Each source phrase includes k gaps and an ordered list of k+1 components, where each component comprises one or more words of the phrase. Each of the k gaps allows one word from another phrase to be inserted between two of the words of the elastic phrase. Similarly each target phrase includes l gaps and l+1 components. Both k and l can independently assume a positive natural number, including 0, such as 0, 1, 2, 3, 4, 5 etc. Although when k or l takes a value of zero there is no actual gap, it is convenient to model the gaps in this way. An elastic bi-phrase is thus a triple of the form (s,t,dist) where s is a source gapped phrase, t is a target gapped phrase, dist is a probability distribution over $N^k \times N^l$, where k and l are the number of gaps of s and t, respectively, and N represents the set of positive natural numbers. The distribution dist is used to model the conditional probability of getting specific sizes for each of the k source and l target gaps conditional on the actual use of the given gapped bi-phrase in a (sentence-level) translation.

For example, when k=2, consider the list [[take the train], [from], [to]] as an elastic phrase with two gaps, each corresponding to one word, and three components, which can also be abbreviated as take the train . . . from . . . to.

The above definition of elastic bi-phrases is a generalized one. In particular it can be used to model the empirical distribution of gaps for a given bi-phrase, without any smoothing/generalization, by just recording a histogram of the observed gap sizes in the training corpus. It also allows the modeling of conditional dependencies between gaps. However, the main interest of this definition appears when some a priori knowledge about such distributions is available.

In aspects of the exemplary embodiment, gaps in source and target phrases are modeled utilizing one or more of the following simplifying assumptions:

1. For a given bi-phrase (s,t), the gap sizes (source and/or target) are mutually independent.
2. Each gap size k (and l) follows a mathematically describable distribution which is fully determined by one or more parameters of the distribution, such as a Poisson distribution:

$$P(k) = \frac{e^{-\mu} \mu^k}{k!}$$

which is fully determined by a single parameter of the distribution, its mean $\mu$, as illustrated in FIG. 1. In this way, gap sizes for which no observed examples are found in the corpus may nevertheless be assigned a non-zero probability of being found in a translation. In the limit case where $\mu=0$ (corresponding to no gaps), a convention that the distribution has its mass concentrated on k=0 is used. In one embodiment, this situation may be handled specially by the decoder for efficiency, as it corresponds to an obligatory contiguity between two words. For example, it may be distinguished by a special notation for convenience.

3. In order to determine μ for a gap size on the source side, consider s, and observe all sentence pairs in the training corpus which use a bi-phrase of the form (s,t). Take μ equal to the empirical mean of the gap size relative to this collection of sentence pairs.

4. For a gap size on the target side, an analogous procedure may be used.

One further simplification may be made, namely to assume that all the components in a gapped phrase are of length one, that is, correspond exactly to one single word. In this simplification, each phrase is considered to be a gapped phrase with a gap between each word. For example, the phrase "take the train . . . from . . . to" is considered as take . . . the . . . train . . . from . . . to, where it is assumed that gaps exist between all the words. Then, for any two words which are actually always contiguous, the distribution for the corresponding gap size is considered to be concentrated on the single value 0 (a limit case of the Poisson distribution with mean 0). Using this convention, contiguous and discontinuous phrases can be treated under a single type, with has the advantage of avoiding the need to learn separately different combinations of contiguous/non-contiguous components with the associated sparseness issues.

The model may include other variants. In one embodiment, gaps on the source side are estimated independently of the target side. Rather than determining the mean values of a source gap by reference to the instances of (s,t) in the training corpus, it may be determined by pooling all the instances of bi-phrases (s,t') where t' may be different from t. The pooled estimates can than replace standard estimates, or they can be used as a back-off when too few occurrences of a bi-phrase are observed, and the standard estimates are likely to be unreliable. Gaps on the target side can be modeled analogously.

While in the embodiment, gaps are considered to be represented by a Poisson distribution, other distributions may be used. For example, a Geometric distribution of the form $P(k)=p(1-p)^k$ may be used, which can be determined by a single parameter $p \in (0,1)$. Such a distribution favors small gaps over large gaps.

Another aspect of the modeling of the gap distribution may include the handling of outliers. Outliers are gap sizes for which an unusually large or unusually small number of instances are observed in the training corpus. An exemplary outlier is illustrated in FIG. 1.

In one embodiment, outliers are ignored in determining the distribution. If, for example, for a given gap, many instances are observed in the training corpus where its value is 0, and then a single or few instances with large values, it is likely that the discrepancy is due to a defect of the chunking procedure on which the counts are based. As will be appreciated, this occurs because the alignments are constructed, and not directly observed. In such cases, it may be appropriate to discard the few suspect instances and force the distribution to have mean 0. More generally, when a few instances are observed that have significantly larger values than the mass of the other instances, it is appropriate to discard them. Standard robust statistics may be used for treating "atypical" instances as outliers. For example, the target sentence "He did not catch the train to Paris this week because he had no desire to travel by train anymore" may be observed as including the non-contiguous phrase not_anymore with a gap size of 16. In reality, the word anymore is not semantically related to not, and thus the outlier gap size of 16 would generate a mean value μ which is too large if this instance were to be used in determining the distribution. Accordingly, it is appropriate to ignore it.

The model presupposes that, for each bi-phrase, the empirical statistics of its observed gap sizes in the training corpus are available. In the exemplary embodiment, a static library of bi-chunks constructed according to the method of Cancedda, et al. is used as the information source for obtaining these statistics. For example, if the model uses a Poisson distribution for each gap independently of other gaps, a first step may include grouping the bi-chunks in the library according to the equivalence relation "same apart from gap sizes" (that is, belonging to the same bi-phrase), and then estimate the mean of each gap relative to the group. The present bi-chunk library may be obtained by combination of the elementary bi-chunks or cepts found in the library of Cancedda, et al.

Translating with Elastic Bi-Fragments

The translation of a source sentence f is produced by combining together bi-fragments so as to entirely cover the source sentence, and produce a well-formed target-language sentence, i.e., a sequence without gaps.

Figure 2:
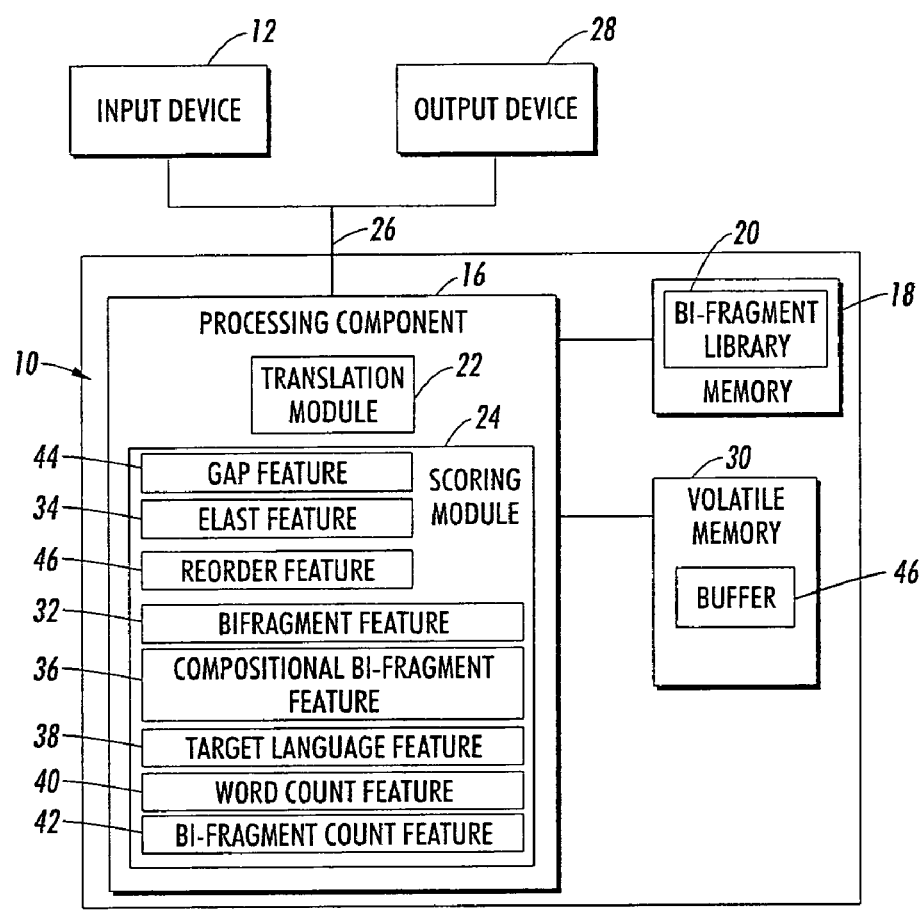
FIG. 2 is a block diagram of a system for machine translation of text which utilizes non-contiguous bi-fragments according to one aspect of the exemplary embodiment.

With reference to FIG. 2, a block diagram of an automated natural language translation system 10 for translating text comprising elastic bi-fragments is illustrated. Text is input to the system by an input device 12. Input text may be directly input into the natural language translation system 10 (for example, as with a person typing sentences into a computer using a keyboard). Alternatively, input text to natural language translation system 10 may be the output of another system, such as, for example, output from a speech recognition system (for example, speech input device) or from an optical character recognition system (not shown). Or the text may be input from a database or word document. The text may include one or more sentences, such as a paragraph or an entire document comprising multiple paragraphs.

The translation system 10 includes a processing component 16 and a memory component 18. A part or all of the memory component 18 may be located remote from the processing component 16 and accessed by a wired or wireless link. The memory component stores a library of bi-fragments 20, including non-contiguous bi-fragments. The processing component 16 executes instructions for performing the method of FIG. 3, which may be stored in an article of manufacture comprising a program storage medium readable by a computer comprising instructions for executing the method, such as memory 18. The illustrated processing component includes a translation module or decoder 22. Working on a string of contiguous words in the source language, such as a sentence of the input text, the translation module 22 accesses the library 20 to retrieve fragments in the target language corresponding to input fragments in the source language text string. The processing component includes a scoring module 24 which evaluates partial and/or full translation hypotheses to identify probable translations of the text string. A system bus 26 provides outputs to an output device 28, such as one or more of a visual display device (such as a monitor with a screen), a hard copy device (such as a printer), and an audible output device (such as, for example, an audio speaker). Translated strings of text and the entire text, once translated, may be stored in volatile or non-volatile memory 30. The system 10 may be instantiated in a personal computer in which the memory 18 may include, for example, read only memory (ROM), random access memory (RAM), flash memory, or any combination of the above as a single component or distributed components. Alternatively, the processing component 16 accesses a remote database which stores the bi-fragment library, for example, via the internet or via a network link. It will be appreciated that computer system 10 may be controlled by operating system software which includes a file management system, such as, for example, a disk operating system, which is part of the operating system software. The file management system may be stored in a non-volatile memory storage device, such as memory 18 and may be configured to cause processing component 16 to execute the various functions required by the operating system to input and output data and to store data in volatile memory 30.

The exemplary scoring module 24 includes instructions for computing a plurality of features 32, 34, 36, 37, 38, 40, 42, 44. It is to be appreciated that the scoring module may employ fewer, more, or different features than the features shown. In various embodiments, two (or more) of these features may be combined into a single feature.

A buffer 46, illustrated herein as located in volatile memory 30, stores unconsumed portion(s) of a target phrase in a partial translation.

Figure 3:
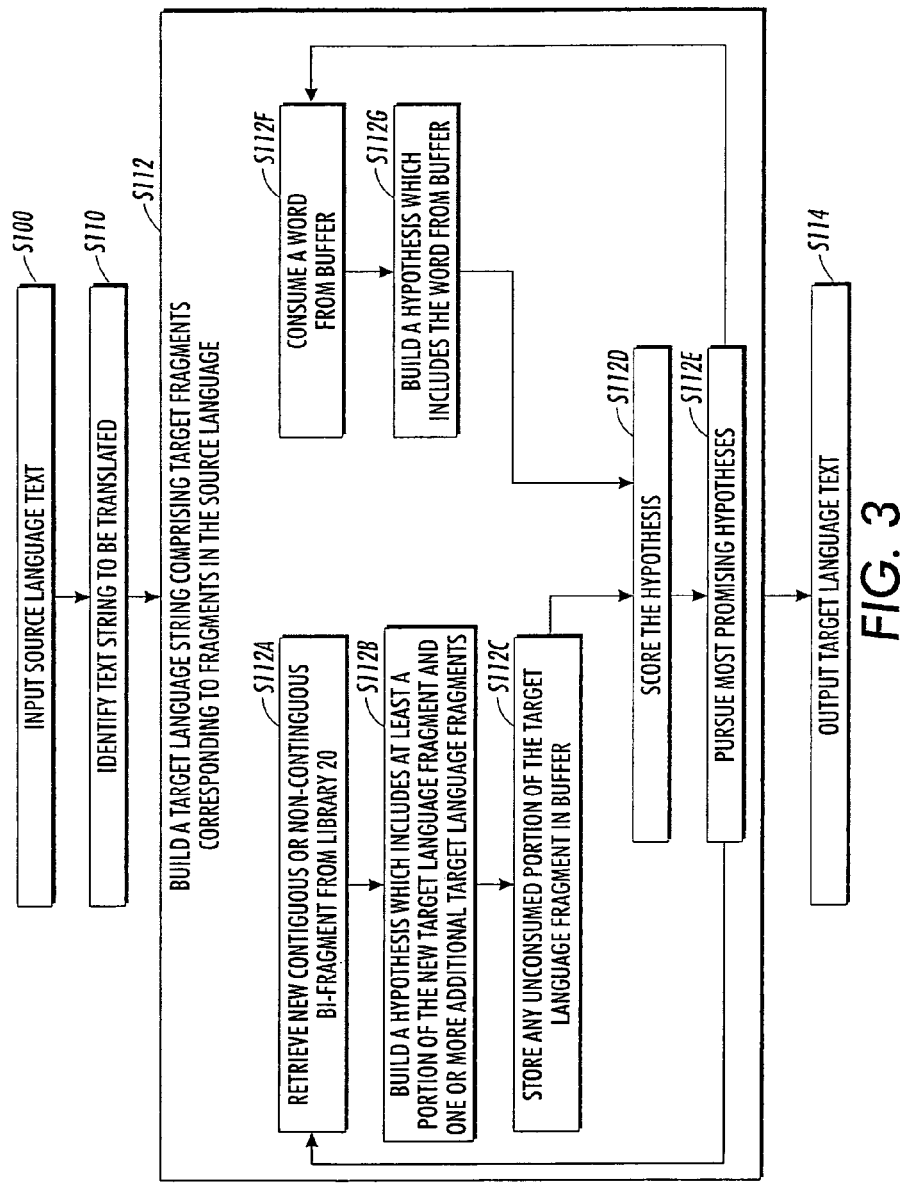
FIG. 3 is a flow diagram of a method for machine translation of text which utilizes elastic bi-fragments according to one aspect of the exemplary embodiment.

FIG. 3 illustrates steps in an exemplary method for translation of text comprising non-contiguous bi-fragments. It will be appreciated that the method may include fewer or more steps and that the steps need not proceed in the order outlined. At step S100, source text to be decoded is input to the system 10. At step S110, the processing component 16 identifies a string of the source text to be translated, such as a sentence. This step may include a tokenizing procedure, in which the processing component identifies words in the text, as well as punctuation marks. At step S112, the processing component builds a target language string comprising target fragments corresponding to fragments in the source language. Step S112 may include multiple sub-steps in which the processor retrieves from bi-fragment library 20 a target language fragment corresponding to a fragment of the source language (Substep S112A), builds a hypothesis which includes at least a portion of the target language fragment and one or more additional target language fragments (Substep S112B), optionally stores any unconsumed portions of the target language fragments in buffer 46 to be retrieved as the hypothesis is developed (Substep S112C), scores the partial hypothesis based on a predetermined set of scoring parameters or "features" (Substep S112D) and pursues a set of the most promising (highest scoring) partial hypotheses (Substep S112E) by eliminating low scoring hypotheses. Steps S112A, 112B, 112C, 112D, 112E may be repeated multiple times in the process of generating a target language text string. In a second or subsequent repetition, step S112A may be replaced with step S112F, retrieving an unconsumed portion of a target language fragment (where at a previous step S112C, a portion of the fragment has been stored in buffer). The target language text string corresponding to the highest scoring complete hypothesis is then output at Step S114. These steps will be described in greater detail below.

As will be appreciated, at step S112A, the library 20 may identify an elastic bi-fragment which is retrieved by the processing component and which may ultimately used in translation of the text string. The library may also include contiguous bi-fragments (fragments with a gap size of 0), one or more of which may be utilized in combination with one or more elastic bi-fragments in translation of the source language text string. As discussed above, these contiguous bi-fragments may also be modeled as elastic bi-fragments.

Bi-Fragment Library

To produce translations, the method relies on a collection of bi-fragments, which is referred to as a bi-fragment library 20. This bi-phrase library is obtained on the basis of a large training corpus of bi-sentences (source-target sentences), via several steps involving (i) word-level alignment of training bi-sentences, (ii) extraction of elementary bi-phrases (cepts) from the word-level alignments, and (iii) combinations of elementary bi-phrases which co-occur in a training bi-sentence.

Each of the elastic bi-phrases identified in the training corpus may be stored in a library 20 in memory 18 and linked to one or more parameters (e.g., Poisson distribution mean values) representative of the distribution of source and corresponding target gaps observed in a training corpus.

An Adapted Translation Method

It will be appreciated that a source string may be translated as multiple different target strings where multiple alternative bi-fragments exist. The exemplary translation system may employ a log-linear statistical translation model for identifying statistically probable translations (step S112D). Such models use probability functions to identify a target language string with maximum probability, i.e., a string which optimizes one or more functions which model statistically probable translations. Using elastic bi-fragments in phrase-based translation methods raises a number of issues for the statistical translation model, which the present method addresses by incorporation of "feature functions" into a log-linear statistical translation model. Some of the feature functions may be specific to elastic bi-fragments, while others may be analogous to those described in Cancedda, et al.

Statistical Model

Many existing machine translation systems are based on probability models, that assign to any target language sequence $t_1^J$ a probability of being a translation of a source language sequence $s_1^I$. The general approach in statistical machine translation is to find the most probable translation for $s_1^I$:

$$\hat{t}_1^J = \underset{t_1^J}{\operatorname{argmax}} Pr(t_1^J \mid s_1^I) \quad (1)$$

One approach to approximating $Pr(t_1^J|s_1^I)$ is based on so-called log-linear models $$Pr(t_1^J, d_1^K \mid s_1^I) = \frac{1}{Z_{t_1^J}} \exp \sum_{m=1}^{M} \lambda_m h_m(s_1^I, t_1^J, d_1^K) \quad (2)$$

to represent the conditional probability of a target sentence $t_1^J$ and an "alignment" $d_1^K$ given a source sentence $s_1^I$, where each fragments "feature function" $h_m$ scores a particular aspect of the relationship between $s_1^I$ and $t_1^J$; the contribution of each feature function is determined by the corresponding model parameter $\lambda_m$; and $z_{t_1^J}$ is a normalization constant. The $h_m$ are thus real-valued features representing different aspects of a translation hypothesis, and the $\lambda_m$ are weights associated with these features. An alignment $d_1^K$ represents a division of the source and target sentences into non-contiguous bi-phrases $a_k$ found in the bi-phrase library.

Additional variables can be introduced in such a log-linear model, so as to account for selected characteristics, and the feature functions can be extended accordingly. For example, if the translation $t_1^J$ of $s_1^I$ is produced using bi-fragments as described here, the model can be modified to take into account the actual set of decisions that lead to $t_1^J$.

Note that given an alignment $d_1^K$, $t_1^J$ is actually redundant, because it can be directly derived as $t(d_1^K)$. For uniformity of the notation here, it is retained.

When solving the machine translation problem (Eqn. 1) with this type of model, the value of $Z_{f,i}^1$ need not be computed explicitly, because it depends only on $s_1^I$, and so the problem reduces to:

$$\hat{t}_1^J = \underset{t_1^J}{\operatorname{argmax}} \sum_{m=1}^{M} \lambda_m h_m(s_1^I, t_1^J)$$

Exemplary Features Suitable for Treatment of Elastic Bi-Phrases

For example, the present model can include the following feature functions as illustrated in FIG. 2:

1. A "bi-fragment" feature $h_{bf}$, illustrated at 32. It represents the probability of producing $t_1^J$ using some set of bi-fragments, under the assumption that each source fragment produces a target fragment independently of the others:

$$h_{bf}(s_1^I, t_1^J, d_1^K) = \sum_{k=1}^{K} \log Pr(\text{target}(d_k) \mid \text{source}(d_k)), \quad (3)$$

where target($d_k$) and source($d_k$) are the target and source side fragments respectively of the bi-phrase $d_k$, and where Pr(target($d_k$)|source($d_k$)) is obtained from training corpus counts as the contribution of a single gapped bi-phrase (s,t) to be:

$$-\log(\text{counts}(s,t)/\text{count}(s)), \quad (4)$$

The $h_{bf}$ feature estimates the log of the probability of observing the bi-phrase configuration (s,t) given the source phrase configuration s in the training corpus through the ratio of respective counts of these configurations. In counting these configurations, no account is taken of the actual gap sizes observed, but only of the fact that the configuration is observed, irrespective of the actual gap sizes observed. The exemplary embodiment may differ in this respect from the method disclosed in Cancedda, et al.

2. A gap size scoring feature ($h_{ELAST}$), illustrated at 34, corresponding to the probability of the gap sizes assigned to (s,t) in the translation, relative to the distribution dist associated with (s,t) in the training phase. Specifically, $h_{ELAST}$ may be defined as:

$$h_{ELAST}(s_1^I, t_1^J, d_1^K) = \sum_{k=1}^{K} EL(\text{target}(d_k), \text{source}(d_k))$$

where EL may be a function of the probabilities of gaps in the target and source fragments for a bi-fragment. The contribution to this feature of a single d=(s,t) may be given by the expression:

$$EL(s,t) = \log(\text{dist}_{(f,e)}(gs_1, \ldots, gs_k; gt_1, \ldots, gt_l)), \quad (5)$$

where $gs_1, \ldots, gs_k$ are the gap sizes (in number of words) of each of the phrases in the translated source text and $gt_1, \ldots, gt_l$ are the gap sizes (in number of words) of the phrases in the target text. This expression can be simplified using the assumptions described above, including assuming Poisson distributions, to:

$$EL(s,t) = \sum_{1 \le i \le k} \log Poisson[\mu_i](gs_i) + \sum_{1 \le j \le l} \log Poisson[\mu_j](gt_j). \quad (6)$$

This feature estimates the log of the probability of observing certain values of the gap sizes as the sum of the logs of the individual Poisson distributions associated with each gap. Because the sum of logs corresponds to the log of the product of these individual distributions, this corresponds to assuming independence of the individual distributions. The gap scoring feature $h_{ELAST}$ thus favors translation hypotheses which include statistically more probable gap sizes over those with statistically less probable gap sizes, where the $\mu_i$'s and $\mu_j$'s are obtained by computing the means of the observed gap sizes (for each individual gap location) in the training corpus.

While in the exemplary embodiment, a separate bi-fragment feature function $h_{bf}$ and an $h_{ELAST}$ feature are described, the two features may be combined into one feature: $h_{bf'} = h_{bf} + h_{ELAST}$.

In another embodiment, two $h_{ELAST}$ features 34A, 34B may be utilized, one for the target side, and the other for the source side. Considering only a target side $h_{ELAST}$ feature may not be beneficial as it would not penalize "spurious" versions of source side phrases with unlikely gap sizes. This may occur when distant words in the source sentence happen to be potential elements of a phrase (consider such examples as "faire . . . la vaisselle" in the sentence "On peut faire beaucoup d'argent en important en france de la vaisselle chinoise"). However, other features could be utilized to account for such unlikely gap sizes. As will be appreciated, an object of any translation model is to provide accurate translations and each added feature may contribute to this accuracy to greater or lesser extents. To some degree, designing features in a log-linear model is presently more an art than a science. In determining whether to add a feature, consideration should be given to balancing the modeling precision gained by adding new features with the increase in the size of the evaluation set on which the weights of the features are trained. In current log-linear (maxent) SMT systems, the evaluation set is typically limited to a few hundred sentences, in part because each iteration of the weight-optimization procedure requires translation of the entire evaluation set.

Other features are optionally included that calibrate certain dependencies between gap sizes ignored by the simple model of equation (6). For example, a feature computing the ratio of the sum of gap sizes on the target side to the sum of gap sizes on the source side. Adding such a feature is thus an alternative to using more complex parametric models for the distribution of gaps in a bi-phrase.

Heuristics

In adopting the $h_{ELAST}$ feature 34 discussed above, only a few adaptations to the admissible heuristics described in Cancedda, et al. need be made. One adaptation may include lower-bounding the value of $h_{ELAST}$ based on a consideration of the buffer. For each gap between two words $e_1$ and $e_2$ in a target phrase which is deployed in the current partial translation, one of three cases can occur:

(1) $e_1$ and $e_2$ are already placed in the target sequence, in which case the value of the gap is known, and its contribution to $h_{ELAST}$ can be directly evaluated. This computation is performed when $e_2$ has just been moved from a suffix in the buffer to the sequence, using the sequence index of $e_1$, which it is assumed has been maintained on the suffix. At this point, the index on the suffix is updated to the sequence index of $e_2$.

(2) $e_1$ and $e_2$ are both still in the buffer. In this case, the mode (maximum) of the distribution for the corresponding gap is known a priori. The mode can be used as the basis for the optimistic evaluation of the contribution of the gap to the $h_{ELAST}$ feature. For example, if a Poisson distribution of non-integer mean $\mu$ is used, the mode is the integer $\lfloor \mu \rfloor$, which is the largest integer less than or equal to $\mu$ and the optimistic evaluation of the cost of the corresponding gap is therefore:

$$-\log\left[\frac{e^{-\mu}\mu^{\lfloor\mu\rfloor}}{\lfloor\mu\rfloor!}\right] \tag{13}$$

(3) $e_1$ is already in the sequence but $e_2$ is still in the buffer. In this case, the minimum size m of the gap between $e_1$ and $e_2$ is known (namely, the number of words in the sequence which are to the right of $e_1$. This can be determined from the stored index of $e_1$ to which $e_2$ belongs in an elastic phrase, and the index of the last word in the sequence. The mode of the distribution in the interval $[m,\infty]$ can then be used as the basis for the optimistic evaluation of the contribution of the gap to $h_{ELAST}$. In the case of a Poisson distribution this "truncated mode" is simply $\max(m, \lfloor\mu\rfloor)$. In the case where $\mu$ is actually a strictly positive integer, both $\mu$ and $\mu-1$ are modes, so $\lfloor\mu\rfloor$ can still be used.

In case (3), where the number of gaps m in the current hypothesis is less than the mean $\mu$, the optimistic estimate for the $h_{ELAST}$ feature favors adding to the number of gaps until the nearest integer number of gaps to the mean is reached. Where the mean has already been exceeded, the $h_{ELAST}$ feature favors consuming the next buffered word immediately.

In this description, a conceptually simple model may be used which assumes that there are gaps between any two words. In particular, even if the gap between the two words is uniformly of size 0, corresponding to a "contiguous" situation, the decoder may first consume the first word, and only be forced to consume the second word after all competing moves (that create a gap between the two words) are seen to incur infinite cost. In an alternative embodiment, a minor adaptation of the decoder allows the second word to be consumed as soon as the first word has been consumed, which is more efficient.

Other Features Which May be Used

In addition to the two features described above, the log linear model may include analogous features to those described in Cancedda, et al, along with their associated heuristics. These may include one or more of:

1. A "compositional bi-fragment" feature function $h_{comp}$ illustrated at 36. This is introduced to compensate for $h_{bf}$'s strong tendency to overestimate the probability of rare bi-fragments. This feature may be computed as in equation (7):

$$Pr(\tilde{t} \mid \tilde{s}) = \frac{1}{|\tilde{s}|^{|\tilde{t}|}} \prod_{t \in \tilde{t}} \sum_{s \in \tilde{s}} Pr(t \mid s) \tag{7}$$

2. A "target language" feature function $h_u$ illustrated at 38. This is based on an N-gram language model of the target language. As such, it ignores the source language sentence and the decomposition of the target into bi-phrases, to focus on the actual sequence of target-language words produced by the combination of bi-phrases:

$$h_u(s_1^I, t_1^J, d_1^K) = \sum_{j=1}^{J} \log Pr(t_j \mid t_{j-N+1}^{j-1}) \tag{8}$$

3. "Word-count" and "bi-fragment" count feature functions $h_{wc}$ and $h_{bc}$, illustrated at 40 and 42, respectively. These control the length of the translation and the number of bi-fragments used to produce it:

$$h_{wc}(s_1^I; t_1^J; d_1^K)=J \quad h_{bc}(s_1^I; t_1^J; d_1^K)=K \tag{9, 10}$$

4. Bi-Fragment Non-Contiguity (Gap feature). In practice, it is to be expected that contiguous bi-fragments (the gap size is 0) are somewhat more reliable than non-contiguous ones. Therefore, one aspect that the translation scoring function may take into account is the amount of "non-contiguity" that goes into any given translation. To this end, a log-linear model may contain a "gap count" feature function $h_{gaps}$, illustrated at 44, which takes as value the total number of gaps (source and target) within the bi-fragments of $d_1^K$, thus allowing the model some control over the nature of the bi-fragments it uses, in terms of the discontinuities they contain. For example, $h_{gaps}$ may be defined by the expression:

$$h_{gaps}(s_1^I, t_1^J, d_1^K) = \sum_{i=1}^{I} gapCount(b(d_i)) \tag{11}$$

where gapCount(b) counts the number of gaps in the source and target fragments of b.

5. Bi-Fragment Reordering ("Distortion") (Reordering Feature) A "reordering" feature function $h_{reord}(s_1^I, t_1^J, d_1^K)$, illustrated at 46, measures the difference in order between source and target fragments. Such feature functions are a standard component in most existing phrase-based machine translation systems. However, measuring bi-fragment reorderings when there are discontinuities cannot be readily implemented with conventional techniques, but can be implemented by the procedure described in Cancedda, et al.

In one embodiment, a measure of reordering is used which relies on the "source coverage vector" V of the sequence of decisions $d_1 \ldots d_K$. This is a vector with as many elements as there are words in the source language input $s_1^I$; each $V_i$ takes as value the index of the first word of the source projection of the decision $d_k$ whose source fragment covers word $s_i$, for a decision $d_k$ of type "new bi-phrase match" or zero if $d_k$ is a decision of type "buffer consumption," or zero again if word $s_i$ is not covered by a fragment in $d_1^K$. The coverage vector can be computed using the procedure of Cancedda, et al. Given $V_s$, thus a measure of reordering is obtained:

$$h_{reord}(s_1^I, t_1^J, d_1^K) = \sum_{k=1}^{K} \sum_{i=1}^{i(d_k)-1} I(V_i > k) \quad (12)$$

where $I(V_i>k)$ returns 1 if its argument is true, 0 otherwise. In other words, $h_{reord}$ sums, for each bi-fragment used to translate $s_1^I$, the number of source language words to the left of the beginning of the current source language fragment, that are translated by target language words from fragments that begin to the right of the current bi-fragment.

Beam Search Procedure

Beam-search procedures are described, for example, in Cancedda, et al., incorporated herein by reference. In an exemplary beam-search procedure, given as input a source-language sentence $s_1^I$ and a collection of relevant bi-fragments, a translation $t_1^J$ is constructed with certain optimal characteristics. Decoding, as this procedure is called, is done by expanding a search graph on the fly. Each node of the search graph represents a partial translation, which is called a hypothesis; each directed edge connecting one node with another node represents a decision (i.e., which bi-fragment is instantiated in which source position for a decision of type "bi-phrase match," or which word is taken from the buffer and appended to the target sequence in a "buffer consumption" decision). Each node H in the graph is uniquely defined by the sequence of decisions $d_1^k$ that connect it to an initial "null hypothesis" node $H_0$ (a starting hypothesis in which there are no words translated). Therefore, to each node H corresponds a pair of a target language sequence and a buffer, which can be denoted $t(d_1^k)$, or just t(H). Starting from the null hypothesis $H_0$, the search proceeds by extending hypotheses: a hypothesis H is extended by adding an edge d (i.e., a decision) to the search graph, connecting it to a new hypothesis H', corresponding to the (possibly partial) translation resulting from the application of the decision d with H. This new hypothesis is then pushed onto a stack of hypotheses in need of being extended.

To reduce the search space, partial translation hypotheses are scored, and the stack is periodically pruned based on these scores, i.e., only the most promising hypotheses are retained on the stack. Furthermore, hypotheses that are deemed equivalent are merged together, so that only one needs to be expanded. The search terminates when all remaining hypotheses on the stack are complete, i.e., they cover all the source words.

Existing decoding procedures assume bi-fragments to be contiguous. The following method adapts a beam search procedure to handle elastic bi-fragments. Additionally, the decoder of the exemplary embodiment makes use of a buffer which stores non-consumed portions of partially consumed target phrases.

Figure 4:
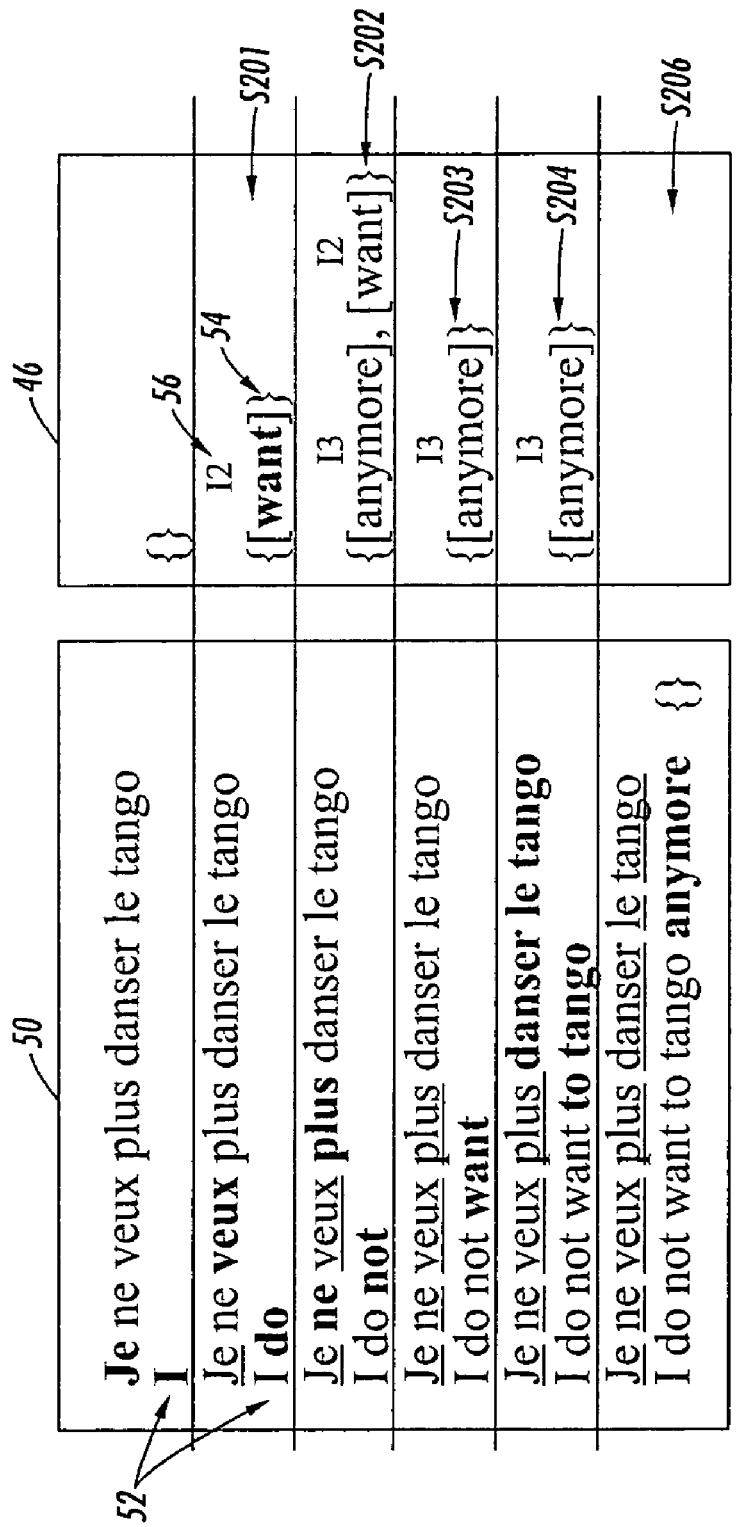
FIG. 4 is an example of the combination of bi-fragments to produce a translation.

In one embodiment, the decoder performs as follows. The current partial translation is represented as: (1) a partial coverage of the words of the source sentence, and (2) a partial target sentence representation. As an example, FIG. 4 illustrates the partial coverage of the source sentence Je ne veux plus danser le tango and the corresponding partial coverage of the target sentence in a series of hypothesis extension steps S201, S202, S203, S204, S206.

The partial target sentence representation is a pair (sequence, buffer). The sequence 52 is a contiguous string of target words, and the buffer 46 comprises a set of target phrase suffixes 54. Each target phrase suffix 54 constitutes the non-consumed portion of a target phrase for which the ongoing hypothesis has established that a gap exists between a first portion and a second portion of the target phrase. The suffix thus corresponds to the words of the elastic phrase which have not yet been included in the sequence. The content of the buffer may vary during the extension of a hypothesis as new suffixes are added and consumed suffixes are removed. Where a suffix includes more than one word, the words may be removed from the buffer one at a time. The suffix 54 may be associated, in the buffer, with information 56 concerning the index of the last word included in the sequence 52 originating from the corresponding target phrase. In the illustrated embodiment, at extension step S201, the consumed portion of a target phrase do is highlighted. In the buffer, the non-consumed portion want of the phrase is stored along with the index I2, indicating that the last word of the consumed portion of the phrase is in the second position of the sequence.

At each hypothesis extension step or "decision," the decoder has the choice between two types of decisions (FIG. 3):

1. New bi-phrase match: taking a new bi-phrase from the bi-phrase library (step S112A), matching the words of its source bi-phrase with empty positions in the source sentence, appending the first word of the target phrase to the end of the sequence (step S112B), and storing the remainder of the target phrase as a new suffix in the buffer (step S112C); and
2. Buffer consumption: one word from a buffered suffix (step S112E) and appending it to the end of the sequence (step S112G).

The process ends when both the coverage of the source is complete and the buffer is empty.

As with the decoder of Cancedda, et al., hypotheses (sequences of decisions) are merged depending on the identity of their state. Two hypotheses may be considered to have the same state if (1) they cover the same source words, (2) the two last words of the sequences are identical ("Identical" here means that the words have the same surface forms and come from the same bi-phrases), for a trigram language model, and (3) the buffers are identical, inclusive of the sequence indexes associated with each suffix and corresponding to the last word consumed from that suffix (identical here means that the buffer contains the same words, coming from the same bi-phrases).

In the decoder of Cancedda, et al., the states (sometimes called "merged hypotheses") are organized in stacks, where two states are put in the same stack if they have the same number of source words covered. Then decoding progresses by considering a given stack at a time, and for each state in this stack, by considering all possible decisions starting from this state. Such a decision produces a new state, which is placed on its proper stack, at a position determined by its heuristic cost, which can be an optimistic estimate of the best complete sequence of decisions passing through this state. In the decoder of Cancedda, et al. each decision results in at least a new source word being covered, and therefore the new state is placed on a stack strictly "to the right" of the current stack. In consequence, once the current stack has been traversed, it is never seen again and the decoder can move to the next stack.

With the elastic decoder of the exemplary embodiment, however, a "buffer consumption" decision does not increase coverage of the source, and therefore involves the addition of the new state to the same current stack (even though a portion of a target phrase is placed in the buffer rather than in the sequence, it is assumed that the entire corresponding source phrase has been covered). However this addition, for an admissible heuristics, is positioned in the stack below the current state, because the heuristic cost of the new state will be larger than that of other states in the current stack. The effect of the addition of the new state may then be to eject the last state of the current stack. This is because, as with the method of Cancedda, et al., the stacks are generally pruned to remove the lowest (highest cost) states, once they reach a preselected number of states.

In the elastic decoder, source coverage may not be the best way to place a hypothesis in the stack. One reason for this is that it does not differentiate between two hypotheses with the same coverage, but at different stages of buffer consumption. Where the decoder allows relatively large stacks, it may be reasonable to ignore the problem. However, there are various ways for accounting for the buffer consumption. One alternative is to allow the stack to increase in size, beyond its predetermined maximum number of hypotheses, where a consumption decision would otherwise result in the hypothesis being expelled from the stack. Another approach is to give a heuristic handicap to hypotheses with a large buffer size, as compared to other hypotheses with the same source coverage. Yet another approach is to organize the stacks according to (1) the length of the target sequence, (2) the sum of the length of the target sequence and the number of covered source words, or (3) a two-dimensional array indexed on the number of covered source words and on the length of the target sequence.

In other respects, the decoding procedure may be analogous to the procedure outlined in Cancedda, et al. Specifically, the current stack is traversed from top to bottom, then the decoder moves to the next stack.

Extending Hypotheses in the Beam Search Procedure

As noted above, extending a hypothesis H means adding an edge (i.e., a decision) to the search graph, connecting it to a new hypothesis H', corresponding to the (possibly partial) translation resulting from the combination of a bi-fragment with H or from the consumption of a buffered word. FIG. 4 illustrates this with the example sentence Je ne veux plus danser le tango. In FIG. 4, words in bold correspond to word of the source sentence which are covered in the decision and words of the target added to the sequence or buffer. Words in the source sentence covered in a prior decision are underlined. As for the method of Cancedda, et al., the beam search may proceed as for a conventional beam search except as otherwise noted. Hypotheses deemed equivalent may be merged together.

With elastic bi-fragments, one conditions is verified before adding an edge from a hypothesis H:

The source language fragment matches source language words, without overlapping source language words from previous bi-fragments (i.e., bi-fragments in decisions leading to H).

Additional constraints can be imposed to reduce the search-space. Here are some examples:

1. A limit may be placed on the number of gaps in any partial translation t(H). Note that a constraint which imposes that partial translation t(H) may not contain gaps at all amounts to translating exclusively with contiguous bi-fragments. Thus, for the present application, the limit should be $\geq 1$.
2. A limit may be placed on the number of target language words placed in the buffer.
3. A limit may be placed on the number of uncovered source language words to the left of the last covered word. Note that if the constraint completely disallows uncovered source language words to the left of the last covered word, the decoder works as a monotone decoder, meaning that reorderings are not allowed between the source and the target. For most translations, the benefits of bi-fragments are not fully realized without allowing some reordering.

Figure 5:
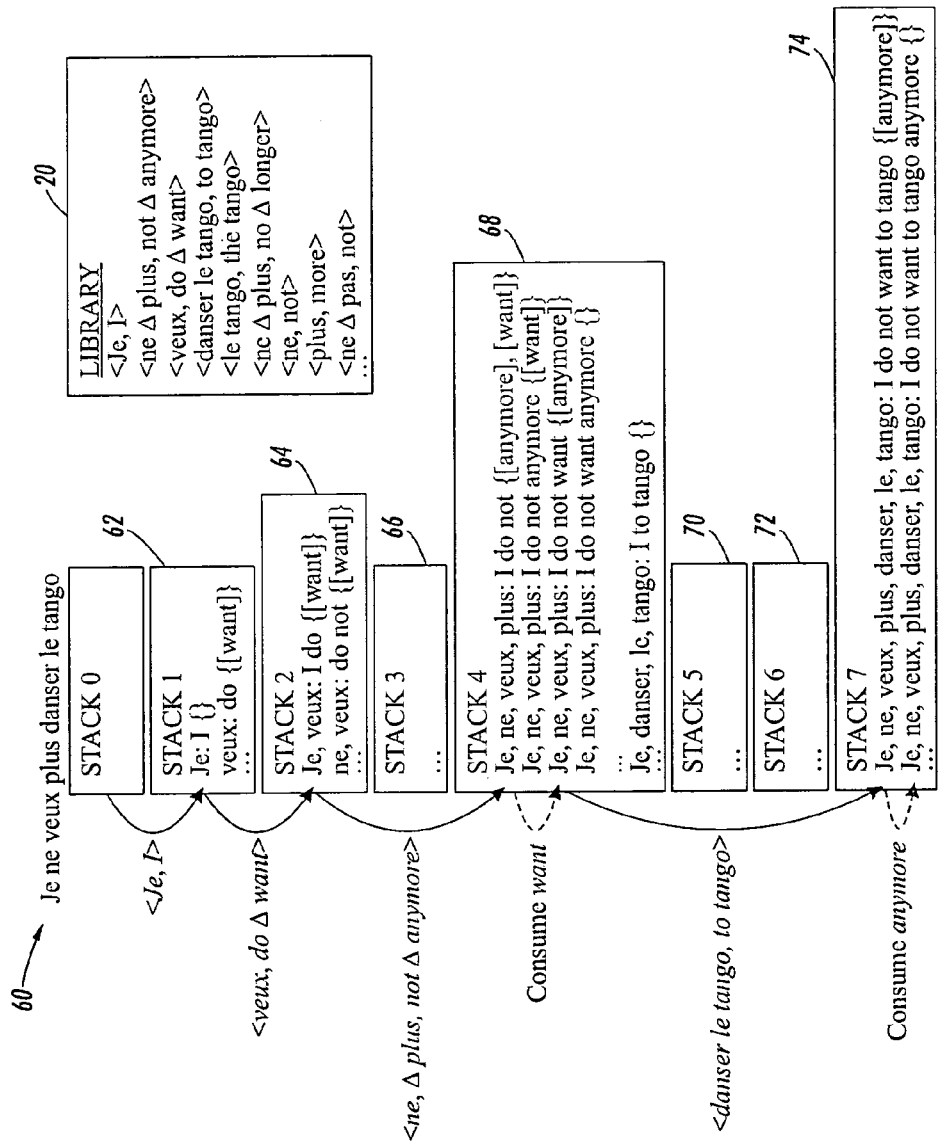
FIG. 5 illustrates the development of hypothesis stacks for a partial translation of the sentence illustrated in FIG. 4.

FIG. 5 illustrates, by way of example, how the stacks utilized in the beam search procedure are developed. The string 60 to be translated is matched to the bi-phrase library 20. It will be appreciated that only some of the possible library matches are illustrated. The symbol Δ is used to represent an elastic gap which is associated with a set of parameters, such as μ for the particular bi-phrase. Words in { } represent words in the buffer. The stacks 62, 64, 66, 68, 70, 72, 74 contain hypotheses (to the extent that they exist) of increasing source-coverage size (respectively, 0, 1, 2, 3, 4, 5, 6, and 7 words), with the last stack 74 corresponding to the number of words in the source string. The 0 stack, by convention contains a null hypothesis. Stack 1 (identified as 62) contains hypotheses in which the source projection is a string of one word, such as Je and danser. The beam search starts with an hypothesis in the first stack and adds a bi-phrase or consumes a buffered word using the principles outlined above. Depending on the number of words in the added source bi-phrase, it may be assigned to the second stack 64 or to a further stack. Where a decision results in consumption of a buffered word, the sequence remains in the same stack. Provided that this new hypothesis is not pruned, it is reconsidered in that stack. Once all the hypotheses in the first stack 62 have been expanded in this way, the search moves to the second stack 64, expanding those hypotheses, and so forth, moving from top to bottom (in the illustrated example) across the stacks until the final stack 72 is reached. Eventually, one or more of the stacks may reach or exceed its maximum beam size and is culled by eliminating hypotheses which are statistically less favored to bring the number of hypotheses to the maximum permitted by the beam. In addition to limiting the stacks to the maximum beam size, the scoring functions may also compare the scores of the hypotheses in the stack and eliminate hypotheses for which the scores differ from those of other hypotheses by more than a predetermined amount.

As shown in the example in FIG. 5, not all of the phrases in the library which include two or more words need to be modeled as elastic bi-phrases, such as the phrases danser le tango and to tango.

The above-described translation method has advantages over conventional translation systems, which may be realized singly or in combination. In one aspect, it has the ability to make use of elastic fragments of source and/or target language text. In another aspect, it includes components within a statistical translation model to model variable gap sizes. In yet another aspect, it includes procedures for efficiently computing the potential of partial translations with discontinuities with regard to the statistical model. In yet another aspect, a search mechanism allows translation of text in almost-constant time.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A machine translation method for translating source text from a first language to target text in a second language, comprising:

receiving the source text in the first language;

accessing a library of bi-fragments stored in computer readable memory, each of the bi-fragments including a text fragment from the first language and a text fragment from the second language, at least some of the bi-fragments being modeled as elastic bi-fragments in which words of a fragment are spaced by a gap which is able to assume a variable size corresponding to a number of other words which are to occupy the gap;

retrieving text fragments from the second language from the library corresponding to text fragments in the source text;

generating, by a processor, at least one target hypothesis, each of said target hypotheses comprising text fragments selected from the second language; and evaluating the target hypothesis with a translation scoring function which scores the target hypothesis according to a plurality of feature functions, at least one of the feature functions comprising a gap size scoring feature which favors hypotheses with statistically more probable gap sizes over hypotheses with statically less probable gap sizes.

2. The method of claim 1, wherein bi-fragments comprising contiguous text fragments are modeled as elastic bi-phrases.

3. The method of claim 1, wherein the generation of a target hypothesis includes generating a partial hypothesis comprising a sequence of words without gaps from the text fragments selected from the second language and storing any unconsumed words of the text fragments used in generating the sequence in a buffer.

4. The method of claim 3, wherein the generation of a hypothesis includes expanding an existing partial hypothesis by at least one of:

adding a word of a new text fragment to the sequence of words; and retrieving an unconsumed word from the buffer to the sequence of words.

5. The method of claim 1, wherein the gap size scoring feature models gap sizes observed in a training corpus as a distribution which is expressed in terms of a parameter of the distribution.

6. The method of claim 5, wherein the distribution comprises a Poisson distribution and the parameter of the distribution comprises a mean value of the Poisson distribution.

7. The method of claim 5, wherein the distribution ignores gap sizes which are determined to constitute outliers.

8. The method of claim 1, wherein each elastic bi-fragment is associated in the library with at least one parameter of a distribution function which is representative of a distribution of acceptable gap sizes for the elastic bi-phrase, the gap size scoring feature utilizing the parameters of the selected text fragments in the evaluation of the hypothesis.

9. The method of claim 1, wherein the generating of a target hypothesis includes performing a multiple stack beam-search.

10. The method of claim 1, wherein the generating of at least one target hypothesis includes generation of a plurality of partial translation hypotheses, scoring the partial hypotheses, and optionally pruning partial translation hypotheses according to their scores.

11. The method of claim 10, wherein the scoring of the partial hypotheses favors adding source words to a partial translation in which a gap exists in an elastic fragment until a mean gap size of a distribution for the elastic fragment is reached and thereafter favors minimizing further increase to the gap size in the partial translation.

12. The method of claim 1, wherein the evaluation of the at least one hypothesis includes selecting a hypothesis from a plurality of hypotheses which maximizes a log-linear scoring function in which weights are assigned to each of the feature functions.

13. The method of claim 12, wherein the log-linear scoring function further includes a bi-fragment feature $h_{bf}$ which estimates a log of the probability of observing a bi-fragment (s,t) given the source phrase s from a ratio of the occurrences of the bi-fragment (s,t) and source phrase s in a training corpus, without consideration to the size of any gaps between words in the bi-fragment and wherein the gap size scoring feature $h_{ELAST}$ estimates a probability for gap sizes assigned to (s,t) in the translation, relative to a gap size distribution associated with the bi-fragment (s,t) in the training corpus.

14. The method of claim 1, wherein the translation scoring function utilizes a log-linear scoring model of the form:

$$Pr(t_1^J, d_1^K \mid s_1^I) = \frac{1}{Z_{f_1^I}} \exp \sum_{m=1}^{M} \lambda_m h_m(s_1^I, t_1^J, d_1^K) \quad (2)$$

to represent the conditional probability of a target sentence $t_1^J$ and an "alignment" $d_1^K$ given a source sentence $s_1^I$, where each "feature function" $h_m$ scores a particular aspect of the relationship between $s_1^I$ and $t_1^J$, a contribution of each feature function being determined by a weight $\lambda_m$; and where $z_{f_1}$ is a normalization constant and where at least one of the feature functions $h_m$ is selected from:

(1) a "bi-fragment" feature $h_{bf}$, of the general form:

$$h_{bf}(s_1^I, t_1^J, d_1^K) = \sum_{k=1}^{K} \log Pr(\text{target}(d_k) \mid \text{source}(d_k)), \quad (3)$$

where $Pr(\text{target}(d_k) \mid \text{source}(d_k))$ represents a conditional probability of a target fragment given a source fragment, irrespective of their gap sizes; and (2) a gap size scoring feature ($h_{ELAST}$), of the general form:

$$h_{ELAST}(s_1^I, t_1^J, d_1^K) = \sum_{k=1}^{K} EL(\text{target}(d_k), \text{source}(d_k))$$

where EL represents a logarithm of a probability of observing a certain configuration of gap sizes in the target and source fragments of a bi-fragment.

15. The method of claim 14, wherein the translation scoring function outputs a translation for which the log-linear scoring model is maximized.

16. A machine translation system for translating source text from a first language to target text in a second language, comprising:

memory which stores instructions for performing the method of claim 1; and a processor which executes the instructions.

17. A machine translation system for translating source text from a first language to target text in a second language, comprising:

a library of bi-fragments, each of the bi-fragments including a text fragment from the first language and a text fragment from the second language, at least some of the bi-fragments being modeled as elastic bi-fragments in which words of a fragment are spaced by a gap which is able to assume a variable size corresponding to a number of other words which are to occupy the gap, each of the elastic bi-fragments being associated in memory with a parameter representative of a gap size distribution for the bi-fragment; and a processor which executes instructions for retrieving text fragments from the second language from the library corresponding to text fragments in the source text, generating at least one target hypothesis, each of said target hypotheses comprising text fragments selected from the second language, and evaluating the hypothesis with a translation scoring function which scores the hypothesis according to a plurality of features, at least one of the features comprising a gap size scoring feature which favors hypotheses comprising text fragments with statistically more probable gap sizes over hypotheses with statically less probable gap sizes.

18. The machine translation system of claim 17, wherein translation scoring function further includes at least one of:

a second feature function which evaluates bi-fragment discontinuities; and a third feature function which evaluates bi-fragment reorderings.

19. The machine translation system of claim 18, wherein the second feature function counts gaps in the target text of the hypothesis and corresponding source text.

20. The machine translation system of claim 17, wherein the library associates each of a plurality of elastic bi-fragments with a corresponding parameter representative of a probability distribution of gaps in at least one of the source text fragment and the target text fragment.

21. The translation system of claim 17, wherein the processor includes instructions for generation of a hypothesis which includes expanding an existing partial hypothesis by at least one of:

adding a word of a new text fragment to the sequence of words; and retrieving an unconsumed word from the buffer to the sequence of words.

22. An article of manufacture comprising a program storage medium readable by a computer comprising instructions for executing the method of claim 1.

\* \* \* \* \*